United States Patent
Kim et al.

(10) Patent No.: US 7,711,196 B2
(45) Date of Patent: May 4, 2010

(54) APPARATUS AND METHOD FOR GENERATING CODED BLOCK PATTERN FOR ALPHA CHANNEL IMAGE AND ALPHA CHANNEL IMAGE ENCODING/DECODING APPARATUS AND METHOD USING THE SAME

(75) Inventors: Wooshik Kim, Gyeonggi-do (KR); Hyun Mun Kim, Gyeonggi-do (KR); Daesung Cho, Seoul (KR); Jinhyung Park, Gyeonggi-do (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1340 days.

(21) Appl. No.: 10/992,741

(22) Filed: Nov. 22, 2004

(65) Prior Publication Data

US 2005/0117789 A1 Jun. 2, 2005

(30) Foreign Application Priority Data

Nov. 21, 2003 (KR) .................. 10-2003-0083054
Mar. 5, 2004 (KR) .................. 10-2004-0015153

(51) Int. Cl.
*G06K 9/36* (2006.01)
(52) U.S. Cl. .............. 382/233; 382/232; 382/243; 382/236; 382/245; 382/250; 375/240.01; 348/384
(58) Field of Classification Search ........ 382/232, 382/233, 236, 238, 243, 245, 246, 250, 251; 348/384.1, 440; 375/240.01, 240.14, 240.16
See application file for complete search history.

(56) References Cited

U.S. PATENT DOCUMENTS 5,748,789 A * 5/1998 Lee et al. .................. 382/243
5,852,470 A * 12/1998 Kondo et al. ............... 348/448
6,198,508 B1 * 3/2001 Jang et al. ................ 348/391.1

OTHER PUBLICATIONS

Partial European Search Report for European Application No. EP04257198 dated Nov. 23, 2006 (in English).
S. Fukunaga el al., XP-000861688, "MPEG-4 Video Verification Model version 16.0", Mar. 2000, pp. 1-380 (in English).
Yong He et al., "A Shape-Adaptive Partitioning Method for MPEG-4 Video Encoding", The Hong Kong University of Science and Technology, Clear Water Bay, Kowloon, Hong Kong, pp. 239-242 (in English).
Paulo Nunes et al., "A Contour-based approach to binary shape coding using a multiple grid chain code", Signal Processing: Image Communication, pp. 594-599, pp. 586-593 (in English).
Minoru Etoh et al., "Template-Based Video Coding with Opacity Representation", IEEE transactions on circuits and systems for video technology, vol. 7, No. 1, Feb. 1997, pp. 172-180 (in English).

* cited by examiner

*Primary Examiner*—Samir A Ahmed
*Assistant Examiner*—Ali Bayat
(74) *Attorney, Agent, or Firm*—Staas & Halsey LLP

(57) ABSTRACT

An apparatus and a method generate a coded block pattern (CBP) of an alpha channel image. An apparatus and a method encode or decode the alpha channel image using the method. The alpha channel image encoding apparatus includes a CBP generator generating a CBP of a first block corresponding to an encoding unit in the alpha channel image by allocating CBPs to a plurality of second blocks that includes the first block; and a bitstream generator generating a bitstream by encoding the CBP or the CBP and pixel values of the second blocks based on the CBP of each of second blocks.

39 Claims, 16 Drawing Sheets

| 0 | 0 | 2 | 2 | 0 | 0 |
|---|---|---|---|---|---|
| 0 | 0 | 2 | 2 | 2 | 0 |
| 0 | 0 | 2 | 1 | 2 | 0 |
| 0 | 2 | 2 | 1 | 2 | 2 |
| 0 | 2 | 1 | 1 | 1 | 2 |

FIG. 16D

| 0 | 0 | 1 | 1 | 0 | 0 |
|---|---|---|---|---|---|
| 0 | 0 | 1 | 0 | 1 | 0 |
| 0 | 0 | 1 | 0 | 1 | 0 |
| 0 | 1 | 0 | 0 | 1 | 1 |
| 0 | 0 | 0 | 0 | 0 | 1 |

FIG. 17A  FIG. 17B  FIG. 17C
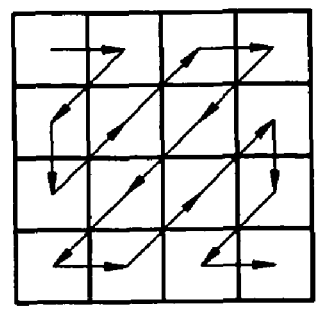 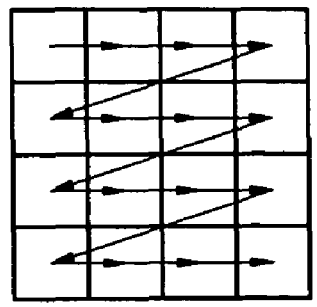 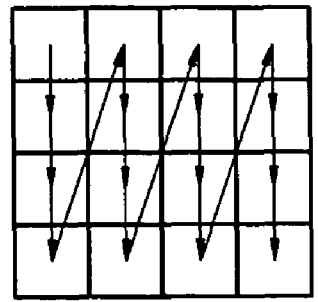
FIG. 18
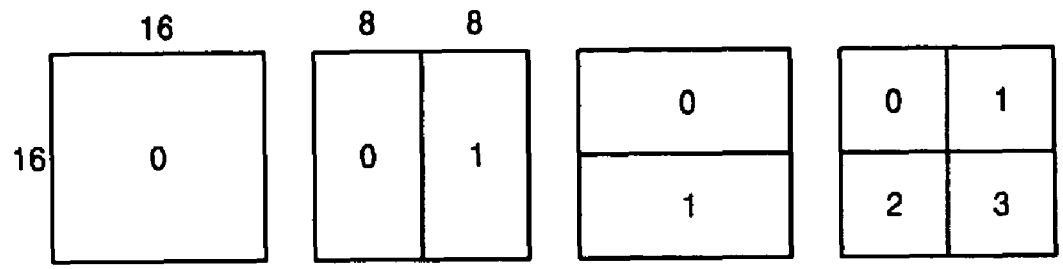
MACRO BLOCK PARTITIONS : 16x16, 16x8, 8x16, 8x8
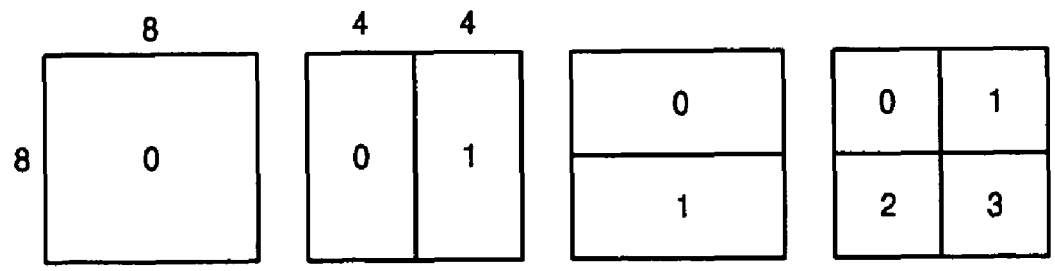
MACRO BLOCK PARTITIONS : 8x8, 8x4, 4x4

APPARATUS AND METHOD FOR GENERATING CODED BLOCK PATTERN FOR ALPHA CHANNEL IMAGE AND ALPHA CHANNEL IMAGE ENCODING/DECODING APPARATUS AND METHOD USING THE SAME

CROSS-REFERENCE TO RELATED APPLICATIONS

This application claims the priority of Korean Patent Application No. 2003-83054, filed on Nov. 21, 2003 and No. 2004-15153, filed on Mar. 5, 2004 in the Korean Intellectual Property Office, the disclosures of which are incorporated herein in their entirety by reference.

BACKGROUND OF THE INVENTION

1. Field of the Invention

The present invention relates to image encoding and decoding, and more particularly, to an apparatus and a method for generating a coded block pattern (CBP) for an alpha channel image and an apparatus and a method for encoding or decoding the alpha channel image using the same.

2. Description of the Related Art

An alpha channel image has served as a mask to select a specific zone in a general image. In the ISO/IEC MPEG-4 standard, a method of encoding an image in object units is defined, wherein shape information is separately encoded to identify the image in object units. The shape information may be considered as the alpha channel image. However, in the MPEG-4 standard, since the shape information is encoded in a different way from a method of encoding general images, it is difficult to realize an apparatus for encoding an alpha channel image, and it is difficult to process the shape information in real time due to a significant amount of calculation.

According to the H.264/MPEG-4 pt.10 AVC standard technology ("Text of ISO/IEC FDIS 14496-10: Information Technology—Coding of audio-visual objects—Part 10: Advanced Video Coding", ISO/IEC JTC 1/SC 29/WG 11, N5555, March, 2003), which has been developed by a Joint Video Team (JVT) of the ISO/IEC MPEG and ITU-TVCEG groups, general image encoding efficiency may be dramatically improved by performing spatial and temporal prediction encoding in various methods. In this standard technology, an enhanced function, integer transform coding, is used, and entropy coding efficiency is also improved using context adaptive binary arithmetic coding (CABAC). However, a method of processing an alpha channel image is not provided.

SUMMARY OF THE INVENTION

The present invention provides an apparatus and a method to generate a coded block pattern (CBP) for an alpha channel image.

The present invention also provides an apparatus and a method to encode or decode an alpha channel image.

According to an aspect of the present invention, an apparatus to generate a coded block pattern (CBP) for an alpha channel image comprises: a block partitioning unit partitioning a first block corresponding to an encoding unit in the alpha channel image into a plurality of second blocks; and a CBP allocator generating a CBP of the first block by allocating a CBP to each of the plurality of second blocks and combining the CBPs of the second blocks.

According to another aspect of the present invention, a method of generating a coded block pattern (CBP) for an alpha channel image comprises: partitioning a first block corresponding to an encoding unit in the alpha channel image into a plurality of second blocks; and generating a CBP of the first block by allocating a CBP to each of the plurality of second blocks and combining the CBPs of the second blocks.

According to another aspect of the present invention, an alpha channel image encoding apparatus comprises: a CBP generator generating a CBP of a first block corresponding to an encoding unit in the alpha channel image by allocating CBPs to a plurality of second blocks comprising the first block; and a bitstream generator generating a bitstream by encoding the CBP or the CBP and pixel values of the second blocks based on the CBP of each of second blocks.

According to another aspect of the present invention, an alpha channel image encoding method comprises: generating a CBP of a first block corresponding to an encoding unit in the alpha channel image by allocating CBPs to a plurality of second blocks comprising the first block; and generating a bitstream by encoding the CBP or the CBP and pixel values of the second blocks based on the CBP of each of second blocks.

According to another aspect of the present invention, an alpha channel image decoding apparatus comprises: a bitstream analyzer analyzing and decoding a bitstream obtained by encoding an alpha channel image for each first block, which is an encoding unit; a CBP analyzer extracting and analyzing a CBP for each of second blocks included in the first block from the decoded data; and an image restorer restoring a current alpha channel image using the CBP analyzed for each of the second blocks and decoded pixel values.

According to another aspect of the present invention, an alpha channel image decoding method comprises: analyzing and decoding a bitstream obtained by encoding an alpha channel image for each first block, which is an encoding unit; extracting and analyzing a CBP for each of second blocks included in the first block from the decoded data; and restoring a current alpha channel image using the CBP analyzed for each of the second blocks and decoded pixel values.

According to another aspect of the present invention, a computer readable medium has recorded thereon a computer readable program to perform a method of generating a coded block pattern (CBP) for an alpha channel image and the alpha channel image encoding/decoding method.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which:

FIGS. 16A through 16D schematize a process of encoding an alpha channel image according to an embodiment of the present invention;

FIGS. 17A through 17C illustrate examples of a scanning order used to encode pixel values of blocks;

FIG. 18 illustrates a method of partitioning an image into blocks having a predetermined size for temporal prediction of the image.

DETAILED DESCRIPTION OF THE PREFERRED EMBODIMENTS

Figure 1:
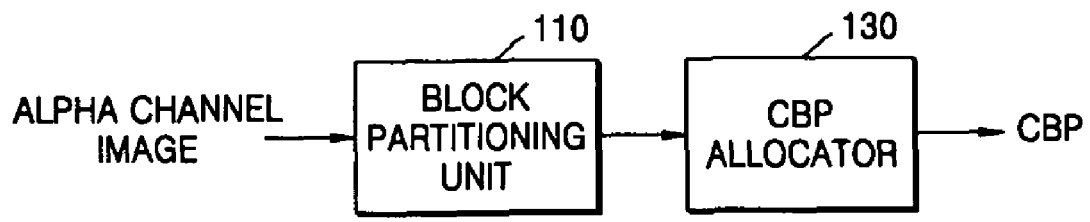
FIG. 1 is a block diagram of an apparatus to generate a CBP for an alpha channel image according to an embodiment of the present invention.

Reference will now be made in detail to the embodiments of the present invention, examples of which are illustrated in the accompanying drawings, wherein like reference numerals refer to the like elements throughout. The embodiments are described below to explain the present invention by referring to the figures.

FIG. 1 is a block diagram of an apparatus to generate a coded block pattern (CBP) for an alpha channel image according to an embodiment of the present invention. The apparatus includes a block partitioning unit 110 and a CBP allocator 130.

The block partitioning unit 110 partitions an alpha channel image having pixel values of 0 or 1 into first blocks corresponding to encoding units and partitions each of the first blocks into a plurality of second blocks. When the encoding unit is a macroblock of 16×16 pixels, the block partitioning unit 110 partitions the alpha channel image into macroblocks and partitions each of the macroblocks into four blocks of 8×8 pixel, respectively.

The CBP allocator 130 generates a final CBP of each of the first blocks by allocating CBP to each of the second blocks included in the first block partitioned by the block partitioning unit 110 and combining the four CBPs.

Figure 2:
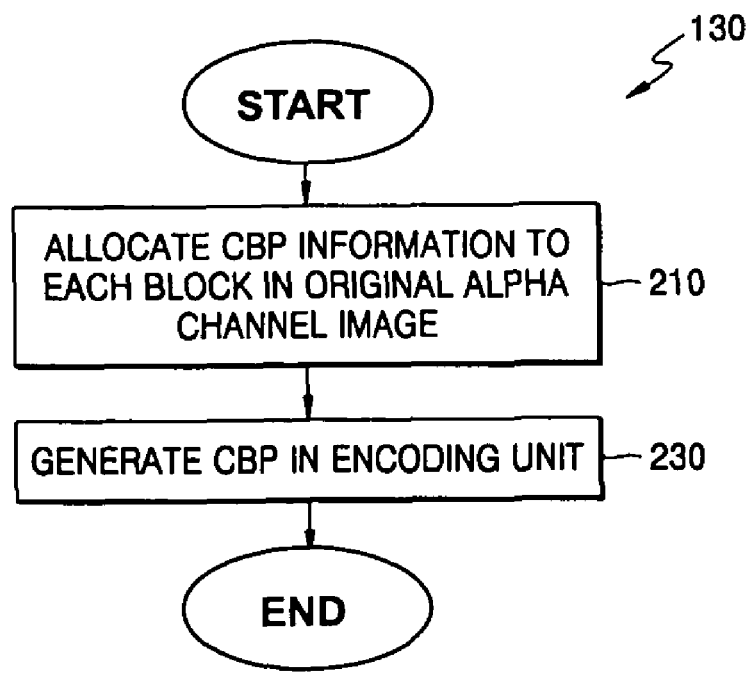
FIG. 2 is a flowchart illustrating an operation according to an embodiment of a CBP allocator of FIG. 1.

FIG. 2 is a flowchart illustrating an operation according to an embodiment of the CBP allocator 130 of FIG. 1, in which CBP is generated with respect to an original alpha channel image.

Referring to FIG. 2, when, a first block is a block of 16×16 pixels and a second block is a block of 8×8 pixels obtained by dividing the first block by 4, in operation 210, a CBP for the second block is allocated. The CBP has one characteristic of {transparent, opaque, mixed}. Generally, "transparent" means a background region, and "opaque" means a selected region. When all pixel values in the second block are "transparent", a CBP for the second block is referred to as "transparent." When all pixel values in the second block are "opaque", a CBP for the second block is referred to as "opaque." When pixel values in the second block are either "transparent" or "opaque", a CBP for the second block is referred to as "mixed."

In operation 230, a CBP for the first block is determined. In this embodiment, the CBP for the first block is generated by combining the CBPs four second blocks. Each of four second blocks may have one of three CBPs, and accordingly, one first block may have one of 81 ($=3^4$) CBPs. Since 81 CBPs for the first block are generated, a 7-bit code is required for fixed-length coding. Generally, since the frequency of generating each CBP among the 81 CBPs is different, variable-length coding is performed after allocating a CBP for the first block depending on an order of frequently generated CBPs.

Alternatively, by integrating CBPs in which a probability of being generated is low with respect to the 81 CBPs, a coding efficiency of CBPs may be improved. For example, the configuration form of one macroblock is set to '00' when the macroblock is composed of 8×8 blocks in which all of the pixel values are 0, 8×8 blocks in which all of the pixel values are 1, or 8×8 blocks in which all of the pixel values are 0 and 8×8 blocks in which all of the pixel values are 1. The configuration form of one macroblock is set to '01' when the macroblock is composed of 8×8 blocks in which all of the pixel values are 0 and 8×8 blocks in which the pixel values of 0 and the pixel values of 1 are mixed. The configuration form of one macroblock is set to '10' when the macroblock is composed of 8×8 blocks in which all of the pixel values are 1 and 8×8 blocks in which the pixel values of 0 and the pixel values of 1 are mixed. The configuration form of one macroblock is set to '01' when the macroblock is composed of 8×8 blocks in which all of the pixel values are 0, 8×8 blocks in which all of the pixel values are 1, and 8×8 blocks in which the pixel values of 0 and the pixel values of 1 are mixed.

Next, the CBP of four 8×8 blocks included in the macroblock is set with 4 bits based on the configuration form of the macroblock. That is, the CBP of each 8×8 block may be set with 1 bit. For example, when the configuration form of the macroblock is set to '10,' the CBP of an 8×8 block in which all of the pixel values are 1 is set to 0, and the CBP of an 8×8 block in which the pixel values of 0 and the pixel values of 1 are mixed is set to 1.

That is, in operation 230, a CBP of one macroblock is generated by combining 2 bits denoting the configuration form of the macroblock and 4 bits denoting the CBP of 8×8 blocks included in the macroblock. When a CBP of one macroblock is generated in the manner described above, the number of kinds of CBP that one macroblock may have is 48, which may be represented with 6 bits. Therefore, even if the number of kinds of CBP that one macroblock may have is $3^4=81$ since one macroblock is composed of four 8×8 blocks, 48 kinds of CBPs whose probability is significant may be selected on the basis of probable statistics. The non-selected 31 kinds of CBPs have a probability distribution close to nearly 0% as experimental results.

Operation 210 may be represented as shown in Table. 1.

TABLE 1

|  | 2 bits | 4 bits |
|---|---|---|
| Transparent/Opaque | 00 | 0: Transparent |
| Transparent/Mixed | 01 | 0: Transparent |
| Opaque/Mixed | 10 | 0: Opaque |
| Transparent/Opaque/Mixed | 01 | 0: Transparent |

Referring to Table. 1, when a macroblock comprises two 8×8 blocks in which all of the pixel values are 0 and two 8×8 blocks in which the pixel values of 0 and the pixel values of 1 are mixed, the configuration form of the macroblock is set to '01,' and the CBP of the four 8×8 blocks is set to '0011.' That is, a CBP of the macroblock is '010011' (=19).

Figure 3:
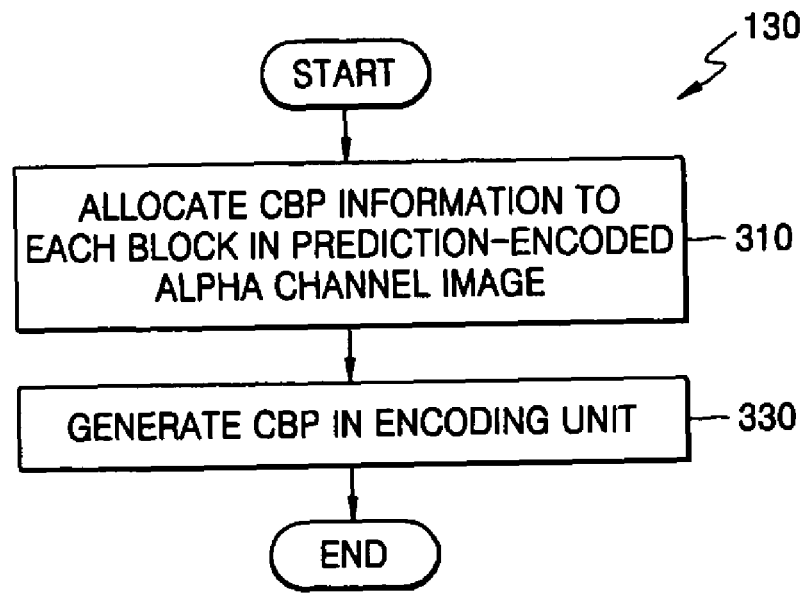
FIG. 3 is a flowchart illustrating an operation according to another embodiment of the CBP allocator of FIG. 1.

FIG. 3 is a flowchart illustrating an operation according to another embodiment of the CBP allocator 130 of FIG. 1, in which CBP is generated with respect to a prediction-encoded alpha channel image.

Referring to FIG. 3, in operation 310, pixel values included in each 8×8 block included in a macroblock of the prediction-encoded alpha channel image are examined. The prediction-encoded alpha channel image is obtained by performing the Exclusive-OR operation of a current alpha channel image and a spatial prediction image, or a temporal prediction image is performed. The result of the Exclusive-OR operation becomes 0 when two pixel values of the current alpha channel image and the spatial prediction image or the temporal prediction image are the same, and 1 when two pixel values of the current alpha channel image and the spatial prediction image or the temporal prediction image are different. 0 is allocated to the CBP when all of the pixel values of one block in the prediction-encoded alpha channel image are 0, and 1 is allocated to the CBP when all of the pixel values of one block in the prediction-encoded alpha channel image are 1, or the pixel values of one block in the prediction-encoded alpha channel image are either 0 or 1.

In operation 330, a CBP of one macroblock is generated by combining 4 pieces of the CBP of the 4 8×8 blocks. When a CBP of one macroblock is generated in the way described above, the number of kinds of CBP that one macroblock may have is $2^4$=16 since one 8×8 block may have one value of {0, 1}.

Figure 4:
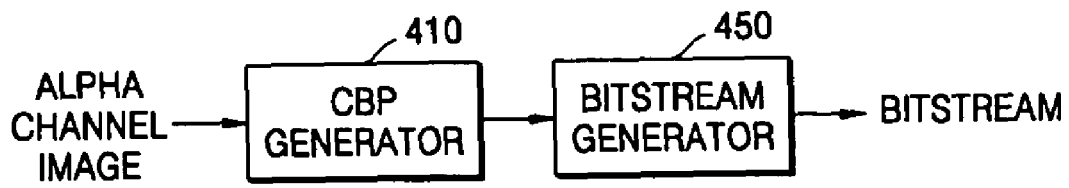
FIG. 4 is a block diagram of an alpha channel image encoding apparatus according to an embodiment of the present invention.

FIG. 4 is a block diagram of an alpha channel image encoding apparatus according to an embodiment of the present invention. The apparatus includes a CBP generator 410, and a bitstream generator 450. An encoder 430, as shown in FIGS. 5 through 8, is optional and may be located before or after the CBP generator 410.

Referring to FIG. 4, the CBP generator 410 generates a CBP for each encoding unit of an alpha channel image. A method of generating a CBP for each encoding unit of an original alpha channel image or a prediction-encoded alpha channel image is in conformance with the method illustrated in FIG. 2 or 3. The original alpha channel image or the prediction-encoded alpha channel image whose CBP for each encoding unit is generated is provided to the bitstream generator 450.

The bitstream generator 450 generates a bitstream by encoding each encoding unit of the original alpha channel image or the prediction-encoded alpha channel image alpha provided from the CBP generator 410, in which it is determined whether the pixel values of each block included in the encoding unit are encoded depending on a CBP of each block. Generally, an entropy encoding may be employed in the bitstream generator 450 to generate the bitstream. In a case in which the bitstream generator 450 receives an original alpha channel image, only the CBP for some macroblocks and the CBP and the pixel values for other macroblock are included in a bitstream provided from the bitstream generator 450. In a case in which the bitstream generator 450 receives a prediction-encoded alpha channel image after generating a CBP, only a CBP for some macroblocks and a CBP, a prediction mode and prediction-encoded pixel values for other macroblocks are included in a bitstream provided from the bitstream generator 450. In a case in which the bitstream generator 450 receives a prediction-encoded, transformed and quantized alpha channel image after generating a CBP, only a CBP for some macroblocks and a CBP, a prediction mode and quantized transform-coefficients for other macroblocks are included in a bitstream provided from the bitstream generator 450. In a case in which the bitstream generator 450 receives a transformed and quantized alpha channel image before generating a CBP, a prediction mode and a CBP for some macroblocks and a prediction mode, a CBP and prediction-encoded pixel values for other macroblocks are included in a bitstream provided from the bitstream generator 450. In a case in which the bitstream generator 450 receives a prediction-encoded, transformed and quantized alpha channel image before generating a CBP, a prediction mode and a CBP for some macroblocks and a prediction mode, a CBP and quantized transform-coefficients for other macroblocks are included in a bitstream provided from the bitstream generator 450.

When a CBP for each encoding unit is generated as one of 48 CBPs according to the method illustrated in FIG. 2, since the pixel values of 0 and the pixel values of 1 are mixed in an 8×8 block for which any bit among a last four bits in a CBP of one macroblock is set to 1 when a first two bits in the CBP are set to '01'or '10,' a CBP and pixel values of the 8×8 block are encoded and included in the bitstream. Otherwise, since the pixel values of 0 and the pixel values of 1 are not mixed in an 8×8 block, only the CBP of the 8×8 block is encoded and included in the bitstream.

When a CBP for each encoding unit is generated as one of 81 CBPs according to the method illustrated in FIG. 2, for an 8×8 block whose CBP is transparent or opaque with respect to each encoding unit, only a CBP of the 8×8 block is entropy encoded and included in the bitstream. For an 8×8 block whose CBP is mixed with respect to each encoding unit, a CBP and pixel values of the 8×8 block is entropy encoded and included in the bitstream.

Meanwhile, when a CBP for each encoding unit is generated according to the method illustrated in FIG. 3, for 8×8 blocks in which the CBP is 0, i.e., all the pixel values are 0, only the CBP of the 8×8 block is encoded and included in the bitstream, and for 8×8 blocks in which the CBP is 1, i.e., all the pixel values are 1, or the pixel values are either 0 or 1, the CBP and the pixel values of the 8×8 block are encoded and included in the bitstream, The H.264 standard supports two entropy encoding methods, Context-based Adaptive Variable Length Coding (CAVLC) and Context Adaptive Binary Arithmetic Coding (CABAC). When the CBP generating method illustrated in FIG. 2 is used, a VLC table used in the H.264 CAVLC or CABAC standard may be used. However, since a probability distribution of CBP values of an alpha channel image differs from the probability distributions in the VLC table for a general image due to the characteristics of the alpha channel image, it is necessary for the VLC table to be reconstructed according to the probability distribution of the CBP values of an alpha channel image. Also, when the CABAC entropy encoding method is used, since the pixel values of most 8×8 blocks are 0, regardless of an inter or intra mode, based on the characteristics of the alpha channel image, the entropy encoding efficiency may be increased by adopted a model used in the inter mode as an initial model of the CABAC.

When a CBP is generated after performing the temporal/spatial prediction encoding, one macroblock may have one of 16 CBPs. In this case, an example of the entropy encoding values allocated to a CBP value of one macroblock is shown in Table 2. Table 2 may be applied equally to both the intra mode and the inter mode.

TABLE 2

| Entropy encoding value | CBP of macroblock |
| --- | --- |
| 0 | 0 |
| 1 | 4 |
| 2 | 2 |
| 3 | 1 |
| 4 | 8 |
| 5 | 10 |
| 6 | 5 |
| 7 | 12 |
| 8 | 3 |
| 9 | 9 |
| 10 | 6 |
| 11 | 14 |
| 12 | 15 |
| 13 | 13 |
| 14 | 7 |
| 15 | 11 |

Referring to Table 2, when a CBP of a macroblock is 8, the CBP of the macroblock is encoded to 4.

Figure 5:
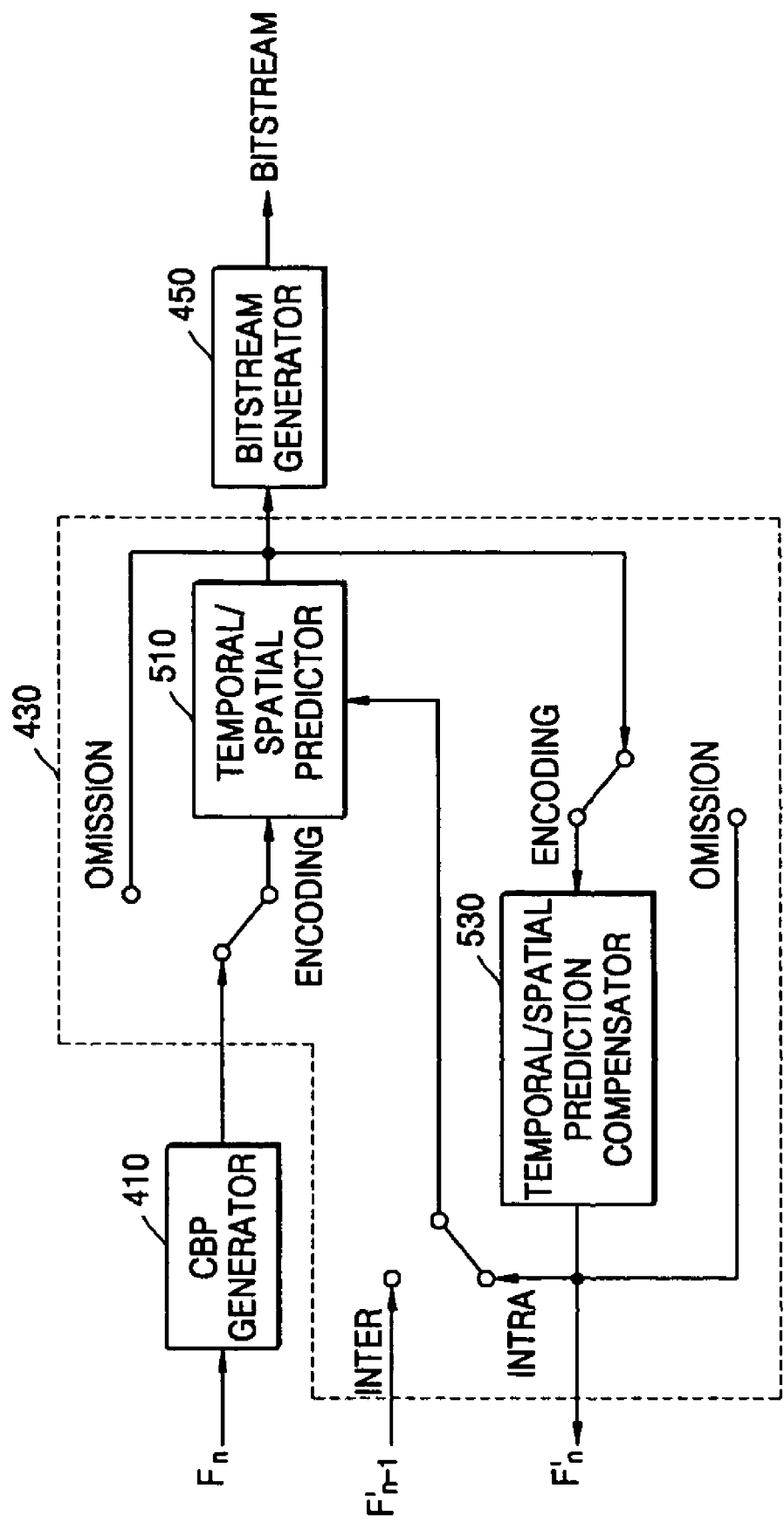
FIG. 5 is a detailed block diagram of an embodiment of an alpha channel image encoding apparatus of FIG. 4.

FIG. 5 is a detailed block diagram of a first embodiment of an alpha channel image encoding apparatus of FIG. 4. The encoder 430 is located between the CBP generator 410 and the bitstream generator 450, and includes a temporal/spatial predictor 510 and a temporal/spatial prediction compensator 530. In FIG. 5, temporal/spatial prediction encoding is performed before entropy encoding, and the entropy encoding is performed for prediction-encoded data.

Referring to FIG. 5, the method illustrated in FIG. 2 is employed in the CBP generator 410. In the CBP generator 410, 8×8 blocks in which a CBP is a "transparent" or "opaque" characteristic of a current alpha channel image $F_n$ are directly output to the bitstream generator 450 and simultaneously become corresponding 8×8 blocks of a restored current alpha channel image $F'_n$, and 8×8 blocks in which a CBP is "mixed", are output to the temporal/spatial predictor 510.

In the intra mode, the temporal/spatial predictor 510 generates a spatial prediction image by spatially predicting the 8×8 blocks output from the CBP generator 410 with reference to the restored current alpha channel image $F'_n$, performs encoding by an Exclusive-OR operation of the current alpha channel image $F_n$ and the spatial prediction image, and provides the result of the Exclusive-OR operation to the temporal/spatial prediction compensator 530 and the bitstream generator 450. In the inter mode, the temporal/spatial predictor 510 generates a temporal prediction image by temporally predicting the 8×8 blocks output from the CBP generator 410 with reference to a restored previous alpha channel image $F'_{n-1}$, performs encoding by an Exclusive-OR operation of the current alpha channel image $F_n$ and the temporal prediction image, and provides the result of the Exclusive-OR operation to the temporal/spatial prediction compensator 530 and the bitstream generator 450. When the Exclusive-OR operation of the current alpha channel image and the spatial prediction image or the temporal prediction image is performed, the result of the Exclusive-OR operation becomes 0 when two pixel values of the current alpha channel image and the spatial prediction image or the temporal prediction image are the same, and 1 when two pixel values of the current alpha channel image and the spatial prediction image or the temporal prediction image are different. That is, since only two kinds of values {0,1} are generated through the temporal/spatial prediction, the encoding efficiency of pixel values may be increased. Likewise, when decoding is performed, an alpha channel image may be restored by performing the Exclusive-OR operation.

The temporal/spatial prediction compensator 530 generates the restored current alpha channel image $F'_n$ by compensating for temporal-prediction-encoded data or spatial-prediction-encoded data output from the temporal/spatial predictor 510. Meanwhile, when the CBP generated by the CBP generator 410 indicates that all the pixel values of the 8×8 block are 'transparent' or all the pixel values of the 8×8 block are 'opaque', the 8×8 block in the restored current alpha channel image $F'_n$ is generated depending on the CBP.

Figure 6:
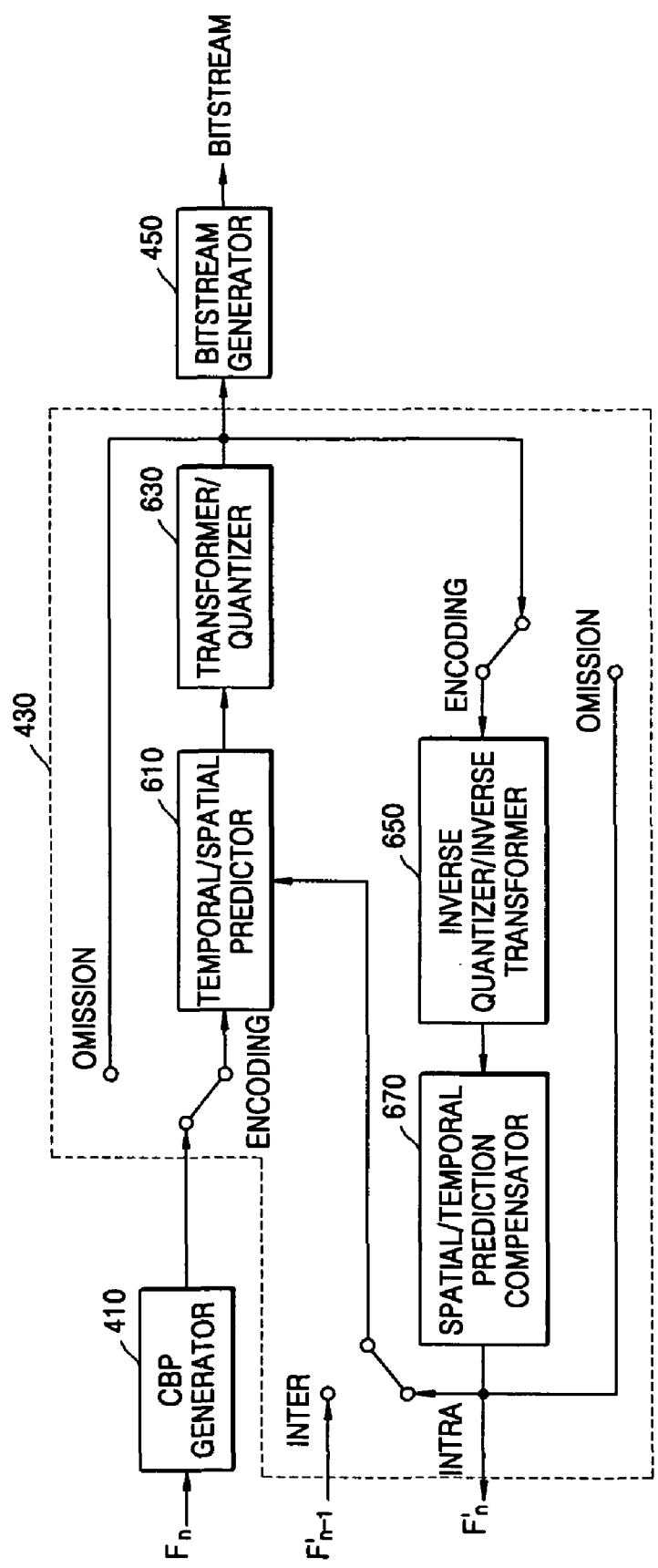
FIG. 6 is a detailed block diagram of another embodiment of an alpha channel image encoding apparatus of FIG. 4.

FIG. 6 is a detailed block diagram of another embodiment of an alpha channel image encoding apparatus of FIG. 4, in which a transformer/quantizer 630 and an inverse quantizer/inverse transformer 650 are added into the alpha channel image encoding apparatus of FIG. 5. In FIG. 6, temporal/spatial prediction encoding is performed before entropy encoding, transforming and quantizing are performed for the temporal/spatial-prediction-encoded data, and the entropy encoding is performed for the transformed and quantized data.

Referring to FIG. 6, the temporal/spatial predictor 610 receives 8×8 blocks, in which the pixel values of 0 and the pixel values of 1 are mixed, of a current alpha channel image $F_n$. In the intra mode, the temporal/spatial predictor 610 generates a spatial prediction image by spatially predicting the 8×8 blocks with reference to a restored current alpha channel image $F'_n$, performs encoding by an Exclusive-OR operation of a current alpha channel image $F_n$ and the spatial prediction image, and provides the result of the Exclusive-OR operation to the transformer/quantizer 630. In the inter mode, the temporal/spatial predictor 610 generates a temporal prediction image by temporally predicting the 8×8 blocks with reference to a restored previous alpha channel image $F'_{n-1}$, performs encoding by an Exclusive-OR operation of the current alpha channel image $F_n$ and the temporal prediction image, and provides the result of the Exclusive-OR operation to the transformer/quantizer 630.

The transformer/quantizer 630 transforms (for example, using a DCT transform) and quantizes the temporal/spatial-prediction-encoded data output from the temporal/spatial predictor 610 and simultaneously outputs the transformed and quantized data to the bitstream generator 450 and the inverse quantizer/inverse transformer 650.

The inverse quantizer/inverse transformer 650 inverse-quantizes and inverse-transforms the data transformed and quantized by the transformer/quantizer 630 and outputs the inverse-quantized and inverse-transformed data to the temporal/spatial prediction compensator 670.

The temporal/spatial prediction compensator 670 generates the restored current alpha channel image $F'_n$ by compensating for the data inverse-quantized and inverse-transformed by the inverse quantizer/inverse transformer 650. Meanwhile, when the CBP generated by the CBP generator 410 indicates that all the pixel values of the 8×8 block are 'transparent' or all the pixel values of the 8×8 block are 'opaque', the 8×8 block in the restored current alpha channel image $F'_n$ is generated depending on the CBP.

Figure 7:
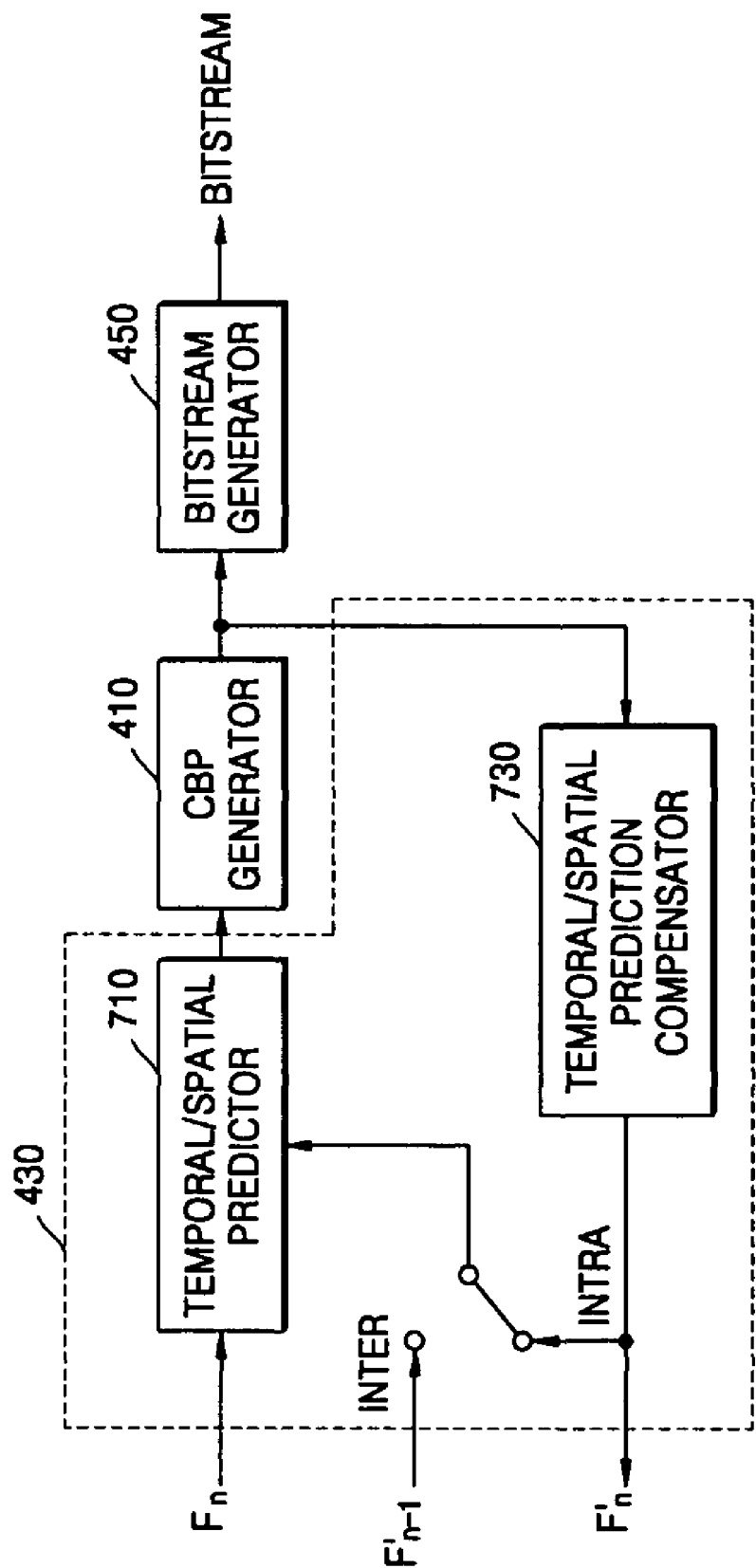
FIG. 7 is a detailed block diagram of another embodiment of an alpha channel image encoding apparatus of FIG. 4.

FIG. 7 is a detailed block diagram of another embodiment of an alpha channel image encoding apparatus of FIG. 4. The encoder 430 is located before the CBP generator 410, and includes a temporal/spatial predictor 710 and a temporal/spatial prediction compensator 730. In FIG. 7, the encoder 430 performs temporal/spatial prediction encoding of a current alpha channel image $F_n$ with reference to a restored previous alpha channel image $F'_{n-1}$ or a restored current alpha channel image $F'_n$ and generates a CBP of the temporal/spatial-prediction-encoded data.

Referring to FIG. 7, the temporal/spatial predictor 710 receives 8×8 blocks of the current alpha channel image $F_n$. In the intra mode, the temporal/spatial predictor 710 generates a spatial prediction image by spatially predicting the 8×8 blocks with reference to the restored current alpha channel image $F'_n$, performs encoding by an Exclusive-OR operation of the current alpha channel image $F_n$ and the spatial prediction image, and provides the result of the Exclusive-OR operation to the CBP generator 410. In the inter mode, the temporal/spatial predictor 710 generates a temporal prediction image by temporally predicting the 8×8 blocks with reference to the restored previous alpha channel image $F'_{n-1}$, performs encoding by an Exclusive-OR operation of the current alpha channel image $F_n$ and the temporal prediction image, and provides the result of the Exclusive-OR operation to the CBP generator 410. Likewise, when decoding is performed, an alpha channel image may be restored by performing the Exclusive-OR operation.

The method illustrated in FIG. 3 is employed in the CBP generator 410. The CBP generator 410 generates a CBP of the temporal/spatial-prediction-encoded data from by the temporal/spatial predictor 710 and outputs the temporal/spatial-prediction-encoded data and the CBP to the bitstream generator 450 and the temporal/spatial prediction compensator 730. Regardless of whether the CBP characteristic is 'opaque' or 'transparent,' since the temporal/spatial-prediction-encoded data has a value of 0 when two pixel values of the current alpha channel image $F_n$ and the spatial prediction image or the temporal prediction image are the same, and a value of 1 when two pixel values of the current alpha channel image and the spatial prediction image or the temporal prediction image are different, a CBP of 8×8 blocks in which all of the pixel values are 0 may be set to 0, and a CBP of 8×8 blocks in which not all of the pixel values are 0 may be set to 1. Also, it is possible to encode the CBP by considering two cases, such as a case wherein all of the pixel values of an 8×8 block are 0, and a case that includes all of the pixel values except the case wherein all of the pixel values of a 8×8 block are 0. Accordingly, the number of kinds of the CBP of one macroblock may be reduced to $2^4(=16)$. Therefore, the encoding efficiency of the CBP may be increased.

With reference to the CBP of each 8×8 block output from the CBP generator 410, the bitstream generator 450 generates a bitstream by entropy-encoding only the CBP for the 8×8 blocks whose CBP is 0, and entropy-encoding the CBP and pixel values of the 8×8 blocks whose CBP is 1.

The temporal/spatial prediction compensator 730 generates the restored current alpha channel image $F'_n$ by compensating for the temporal/spatial-prediction-encoded data, regardless of CBPs output from the CBP generator 410.

Figure 8:
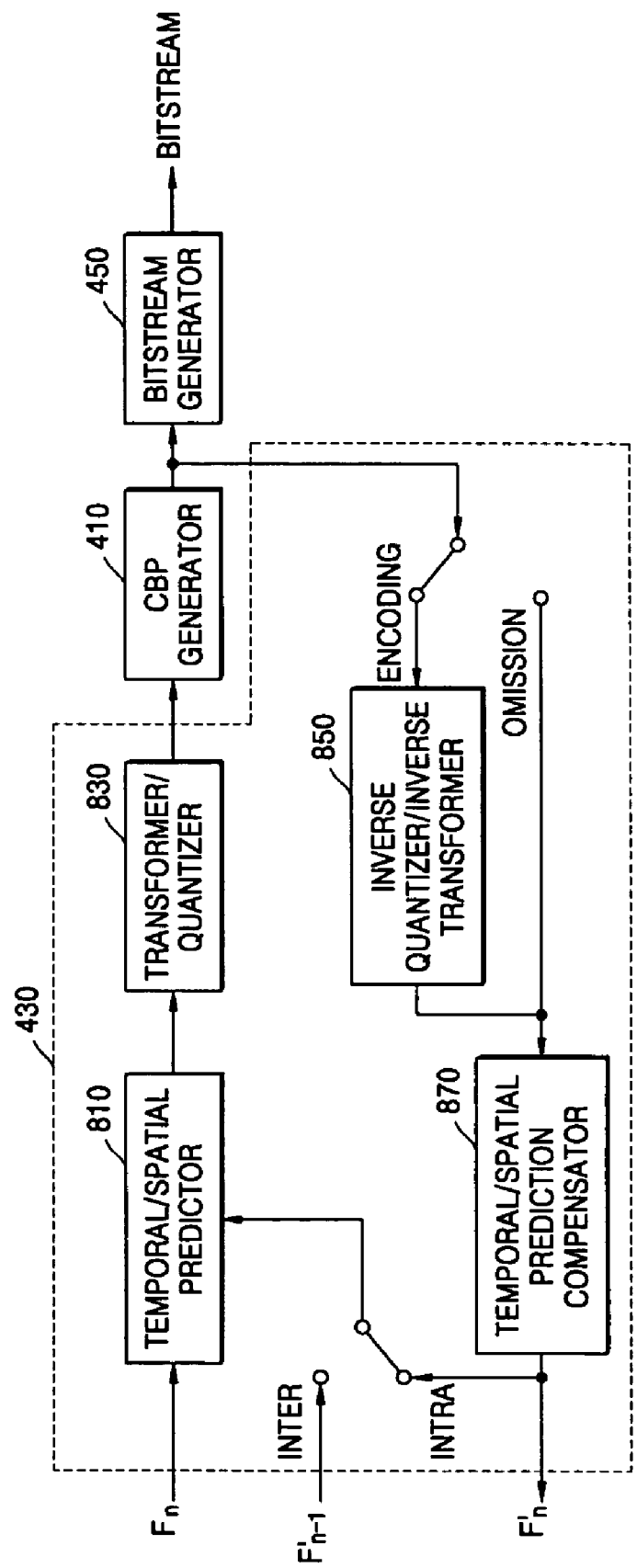
FIG. 8 is a detailed block diagram of another embodiment of an alpha channel image encoding apparatus of FIG. 4.

FIG. 8 is a detailed block diagram of another embodiment of an alpha channel image encoding apparatus of FIG. 4, in which a transformer/quantizer 830 and an inverse quantizer/inverse transformer 850 are added to the alpha channel image encoding apparatus of FIG. 7. In FIG. 8, the encoder 430 performs temporal/spatial prediction encoding of a current alpha channel image $F_n$ with reference to a restored previous alpha channel image $F'_{n-1}$ or a restored current alpha channel image $F'_n$, transforms and quantizes the temporal/spatial-prediction-encoded data, and generates a CBP of each block.

Referring to FIG. 8, in the intra mode, the temporal/spatial predictor 810 generates a spatial prediction image by spatially predicting the current alpha channel image $F_n$ with reference to the restored current alpha channel image $F'_n$, performs encoding by an Exclusive-OR operation of the current alpha channel image $F_n$ and the spatial prediction image, and provides the result of the Exclusive-OR operation to the transformer/quantizer 830. In the inter mode, the temporal/spatial predictor 810 generates a temporal prediction image by temporally predicting the current alpha channel image $F_n$ with reference to the restored previous alpha channel image $F'_{n-1}$, performs encoding by an Exclusive-OR operation of the current alpha channel image $F_n$ and the temporal prediction image, and provides the result of the Exclusive-OR operation to the transformer/quantizer 830.

The transformer/quantizer 830 transforms and quantizes the temporal/spatial-prediction-encoded data from the temporal/spatial predictor 810 and outputs the transformed and quantized data to the CBP generator 410. Here, transforming and quantizing are not performed for an 8×8 block in which all pixel values of are 0 among the temporal/spatial-prediction-encoded data.

The CBP generator 410 generates a CBP of the data provided from the transformer/quantizer 830 and outputs the transformed and quantized data with the CBP to the bitstream generator 450 and to the inverse quantizer/inverse transformer 850. The prediction-encoded data without transforming and quantizing is provided to the bitstream generator 450 and the temporal/spatial prediction compensator 870.

With reference to the CBP of each 8×8 block output from the CBP generator 410, the bitstream generator 450 generates a bitstream by entropy-encoding only the CBP for the 8×8 blocks whose CBP is 0, and entropy-encoding the CBP and pixel values for the 8×8 blocks whose CBP is 1.

The inverse quantizer/inverse transformer 850 inverse-quantizes and inverse-transforms the transformed and quantized data output from the CBP generator 410, whose CBP is 1 and outputs the inverse-quantized and inverse-transformed data to the temporal/spatial prediction compensator 870. Meanwhile, prediction-encoded data for the 8×8 blocks whose CBP is 0 is directly provided to the temporal/spatial prediction compensator 870.

The temporal/spatial prediction compensator 870 generates the restored current alpha channel image $F'_n$ by compensating for the inverse-quantized and inverse-transformed data from the inverse quantizer/inverse transformer 850 or the prediction-encoded data from the temporal/spatial predictor 810. Meanwhile, when the CBP generated by the CBP generator 410 indicates that all prediction-encoded pixel values of the 8×8 block are 0, the 8×8 block in the restored current alpha channel image $F'_n$ is generated after compensating using the temporal/spatial prediction.

Figure 9:
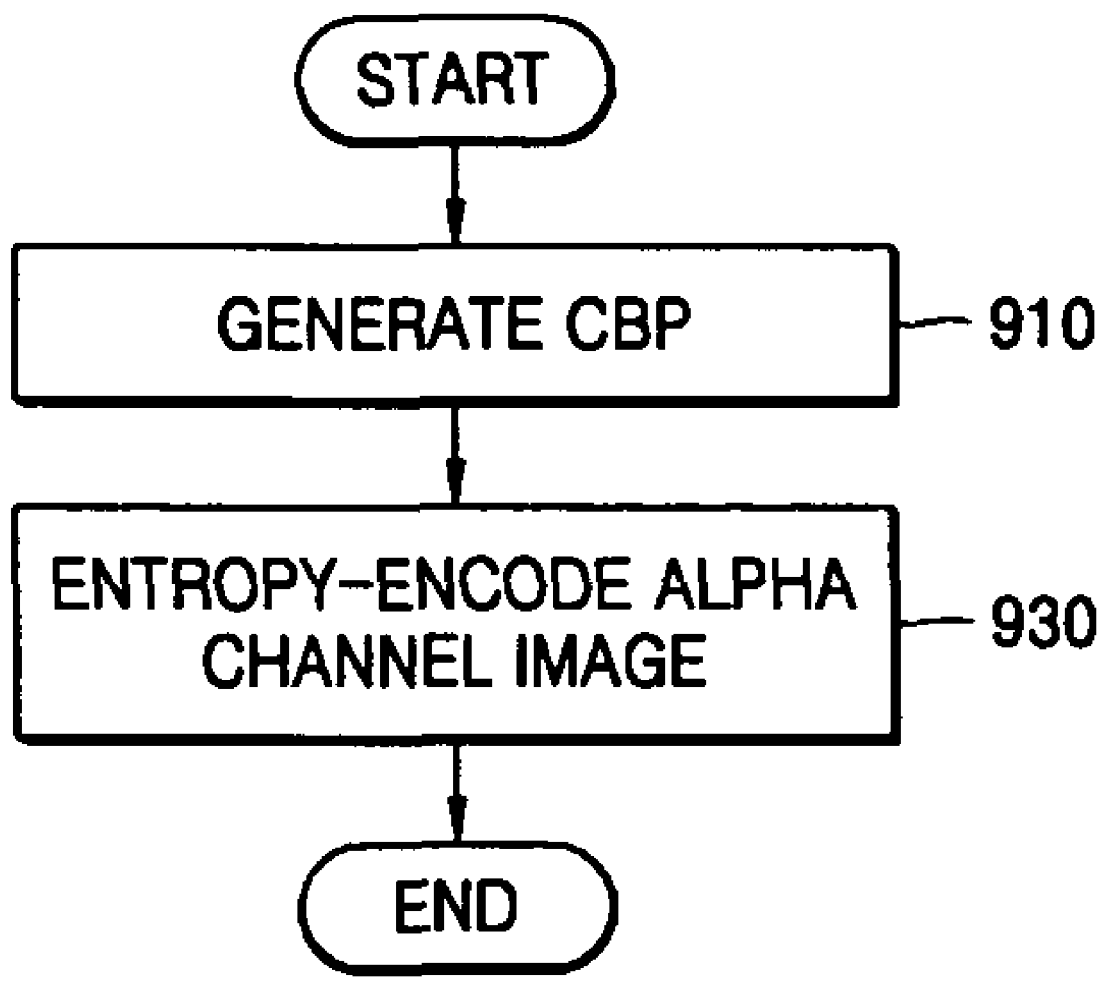
FIG. 9 is a flowchart illustrating an alpha channel image encoding method according to an embodiment of the present invention.

FIG. 9 is a flowchart illustrating an alpha channel image encoding method according to an embodiment of the present invention. Referring to FIG. 9, in operation 910, a CBP is generated for each encoding unit of an alpha channel image. Here, a method of generating a CBP for each block of the alpha channel image operates in accordance with the method illustrated in FIG. 2. In operation 930, a bitstream is generated by entropy-encoding the alpha channel image based on the CBP for each block of the alpha channel image.

On one hand, after operation 910, temporal/spatial-prediction-encoding of the alpha channel image may be performed, or the temporal/spatial-prediction-encoding and transforming/quantizing of the alpha channel image may be performed.

On the other hand, before operation 910, temporal/spatial-prediction-encoding of the alpha channel image may be performed, or the temporal/spatial-prediction-encoding and transforming/quantizing of the alpha channel image may be performed. In this embodiment, a method of generating a CBP for each block of the data obtained by temporal/spatial-prediction-encoding the alpha channel image in operation 910 operates in accordance with the method illustrated in FIG. 3, as described above. Accordingly, a method of entropy-encoding the alpha channel image in operation 930 may also be modified as described above.

Figure 10:
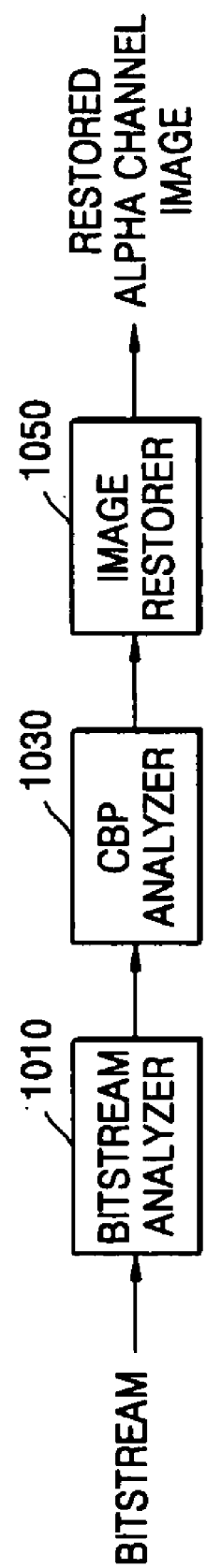
FIG. 10 is a block diagram of an alpha channel image decoding apparatus according to an embodiment of the present invention.

FIG. 10 is a block diagram of an alpha channel image decoding apparatus according to an embodiment of the present invention. The alpha channel image decoding apparatus includes a bitstream analyzer 1010, a CBP analyzer 1030 and a image restorer 1050. A configuration of the image restorer 1050 may be changed according to whether the temporal/spatial-prediction-encoding is performed by the alpha channel image encoding apparatus.

Referring to FIG. 10, the bitstream analyzer 1010 analyses an input bitstream. Generally, entropy decoding may be employed in the bitstream analyzer 1010. The CBP analyzer 1030 analyzes a CBP for each macroblock with respect to the data analyzed by the bitstream analyzer 1010. With reference to the CBP analyzed by the CBP analyzer 1030, the image restorer 1050 restores an alpha channel image according to the CBP for blocks having only an 'opaque' or 'transparent' CBP characteristic and using decoded pixel values for blocks in which the CBP characteristics 'opaque' and 'transparent' are mixed.

Figure 11:
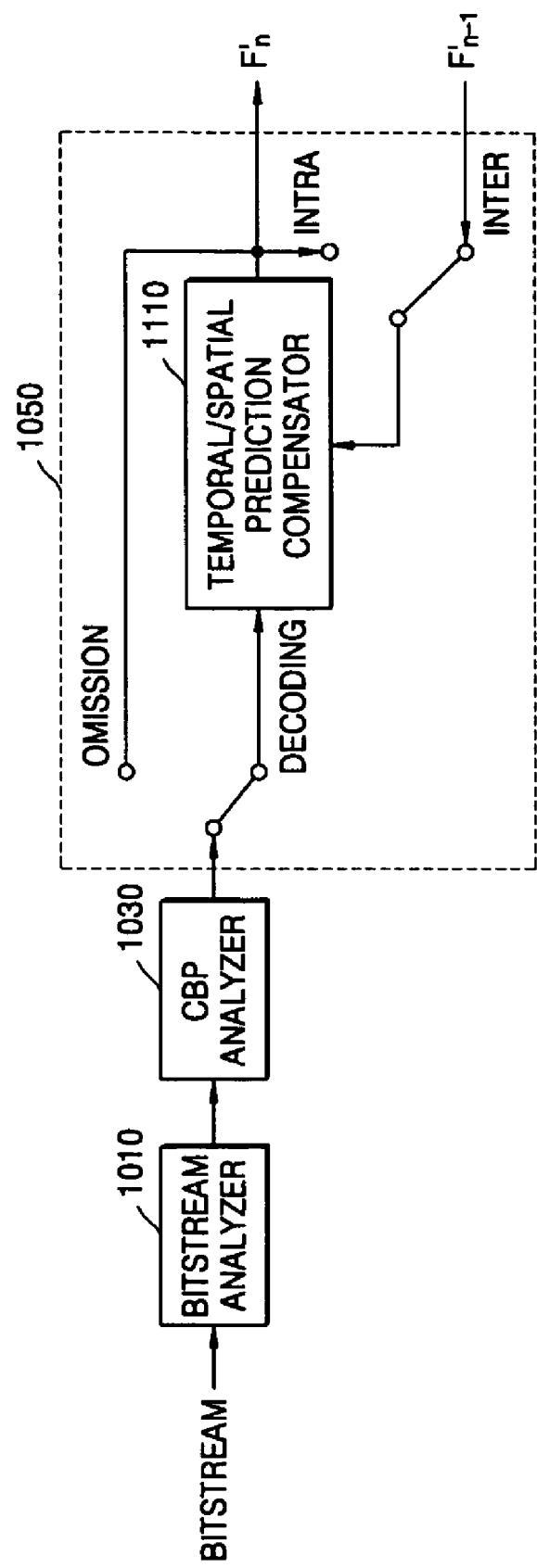
FIG. 11 is a detailed block diagram of an embodiment of an alpha channel image decoding apparatus of FIG. 10.

FIG. 11 is a detailed diagram of an embodiment of the alpha channel image decoding apparatus of FIG. 10. The image restorer 1050 includes a temporal/spatial prediction compensator 1110. The alpha channel image decoding apparatus illustrated in FIG. 11 may correspond to the alpha channel image encoding apparatus illustrated in FIG. 5.

Referring to FIG. 11, the temporal/spatial prediction compensator 1110 restores a current alpha channel image $F'_n$ by temporal/spatial-prediction-compensating the decoded pixel values for blocks in which the CBP characteristics 'opaque' and 'transparent' are mixed with reference to the CBP analyzed by the CBP analyzer 1030. At this time, the temporal/spatial prediction compensator 1110 performs spatial-prediction-compensation with reference to the restored current alpha channel image $F'_n$ in the intra mode and temporal-prediction-compensation with reference to a restored previous alpha channel image $F'_{n-1}$ in the inter mode.

The current alpha channel image $F'_n$ for blocks of only 'opaque' or 'transparent' is restored according to CBP with reference to the CBP analyzed by the CBP analyzer 1030 without prediction encoding.

Figure 12:
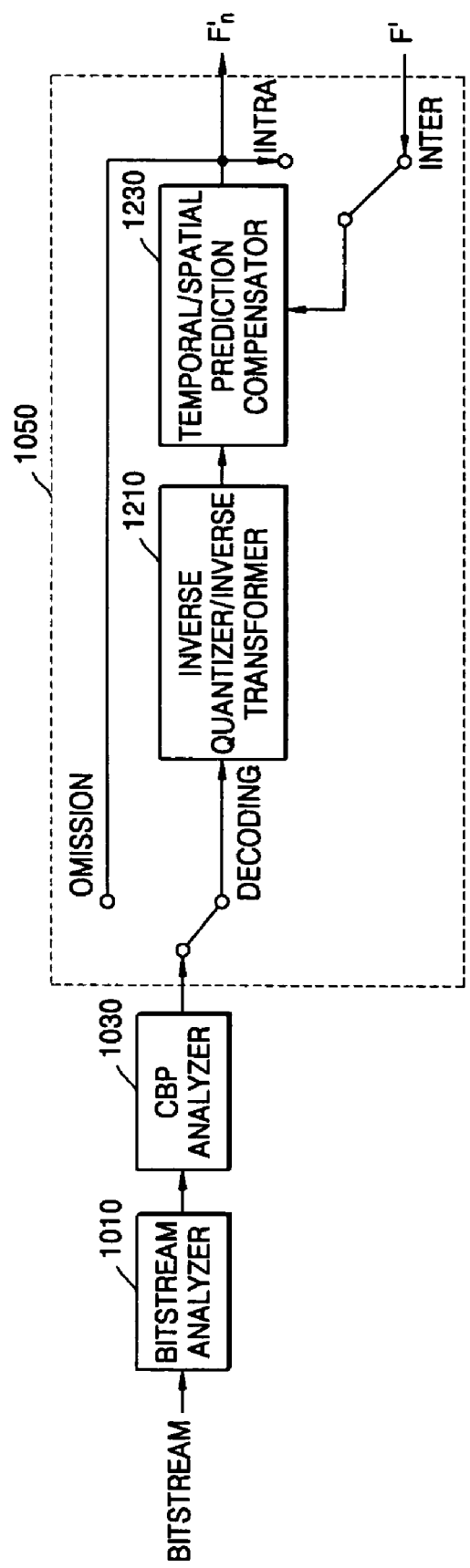
FIG. 12 is a detailed block diagram of another embodiment of an alpha channel image decoding apparatus of FIG. 10.

FIG. 12 is a detailed block diagram of another embodiment of the alpha channel image decoding apparatus of FIG. 10. The image restorer 1050 includes an inverse quantizer/inverse transformer 1210 and a temporal/spatial prediction compensator 1230. The alpha channel image decoding apparatus illustrated in FIG. 12 may correspond to the alpha channel image encoding apparatus illustrated in FIG. 6.

Referring to FIG. 12, the inverse quantizer/inverse transformer 1210 inverse-quantizes and inverse-transforms the decoded pixel values for blocks in which the CBP characteristics 'opaque' and 'transparent' are mixed with reference to the CBP analyzed by the CBP analyzer 1030 and outputs the inverse-quantized and inverse-transformed data to the temporal/spatial prediction compensator 1230.

The temporal/spatial prediction compensator 1230 restores a current alpha channel image $F'_n$ by temporal/spatial-prediction-compensating the inverse-quantized and inverse-transformed data. At this time, the temporal/spatial prediction compensator 1230 performs spatial-prediction-compensation with reference to the restored current alpha channel image $F'_n$ in the intra mode and temporal-prediction-compensation with reference to a restored previous alpha channel image $F'_{n-1}$ in the inter mode.

The current alpha channel image $F'_n$ for blocks having only CBP characteristics of 'opaque' or 'transparent' is restored according to the CBP with reference to the CBP analyzed by the CBP analyzer 1030 without inverse quantizing, inverse transforming and prediction encoding.

Figure 13:
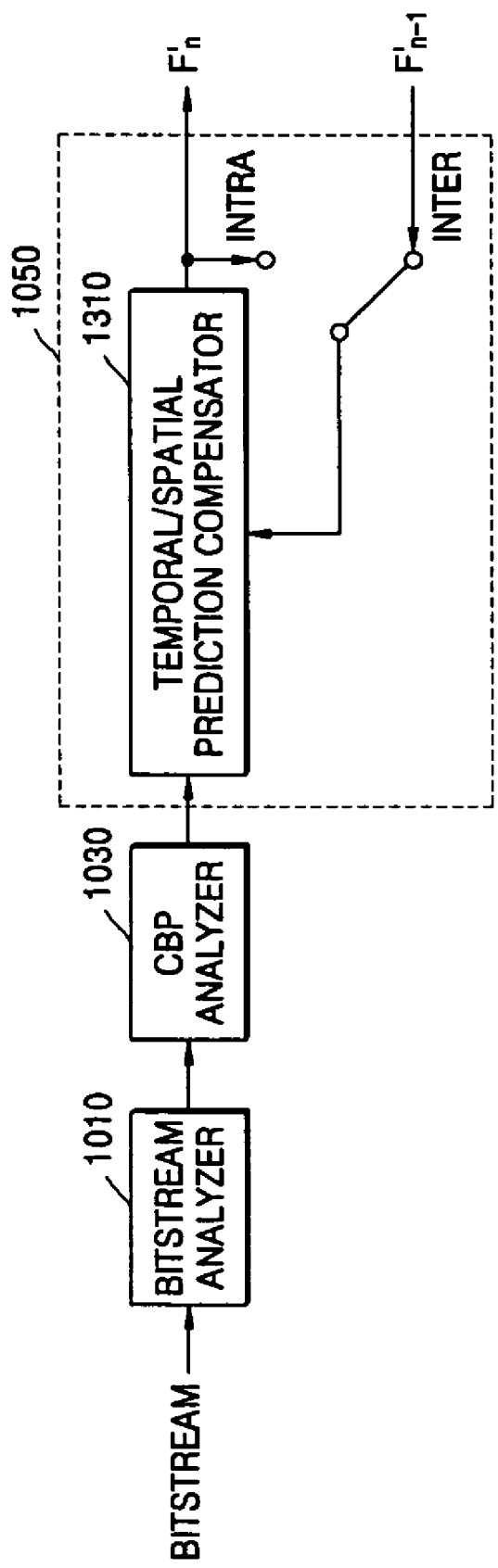
FIG. 13 is a detailed block diagram of another embodiment of an alpha channel image decoding apparatus of FIG. 10.

FIG. 13 is a detailed block diagram of another embodiment of the alpha channel image decoding apparatus of FIG. 10. The image restorer 1050 includes a temporal/spatial prediction compensator 1310. The alpha channel image decoding apparatus illustrated in FIG. 13 may correspond to the alpha channel image encoding apparatus illustrated in FIG. 7.

Referring to FIG. 13, the temporal/spatial prediction compensator 1310 restores a current alpha channel image $F'_n$ by temporal/spatial-prediction-compensating all of blocks regardless of the CBP analyzed by the CBP analyzer 1030. At this time, the temporal/spatial prediction compensator 1310 performs spatial-prediction-compensation with reference to the restored current alpha channel image $F'_n$ in the intra mode and temporal-prediction-compensation with reference to a restored previous alpha channel image $F'_{n-1}$ in the inter mode.

Figure 14:
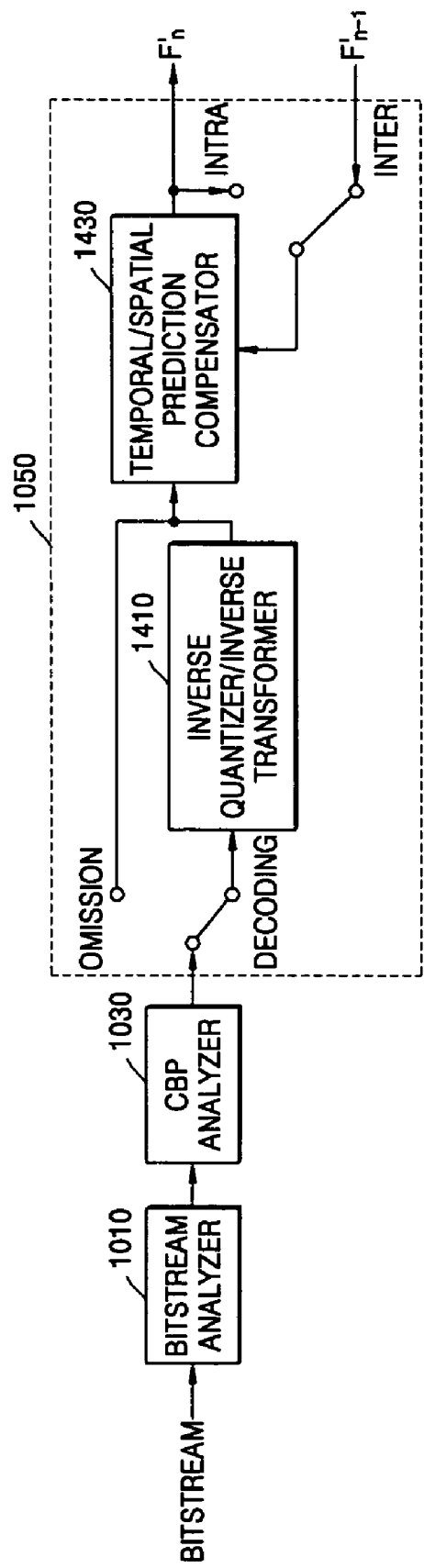
FIG. 14 is a detailed block diagram of another embodiment of an alpha channel image decoding apparatus of FIG. 10.

FIG. 14 is a detailed block diagram of another embodiment of the alpha channel image decoding apparatus of FIG. 10. The image restorer 1050 includes an inverse quantizer/inverse transformer 1410 and a temporal/spatial prediction compensator 1430. The alpha channel image decoding apparatus illustrated in FIG. 14 may correspond to the alpha channel image encoding apparatus illustrated in FIG. 8.

Referring to FIG. 14, the inverse quantizer/inverse transformer 1410 inverse-quantizes and inverse-transforms each of blocks whose CBP is 1, and outputs the inverse-quantized and inverse-transformed data to the temporal/spatial prediction compensator 1430.

The temporal/spatial prediction compensator 1430 restores a current alpha channel image $F'_n$ by temporal/spatial-prediction-compensating the inverse-quantized and inverse-transformed data for blocks whose CBP is 1, and the entropy-encoded data for blocks whose CBP is 0. At this time, the temporal/spatial prediction compensator 1430 performs spatial-prediction-compensation with reference to the restored current alpha channel image $F'_n$ in the intra mode and temporal-prediction-compensation with reference to a restored previous alpha channel image $F'_{n-1}$ in the inter mode.

Figure 15:
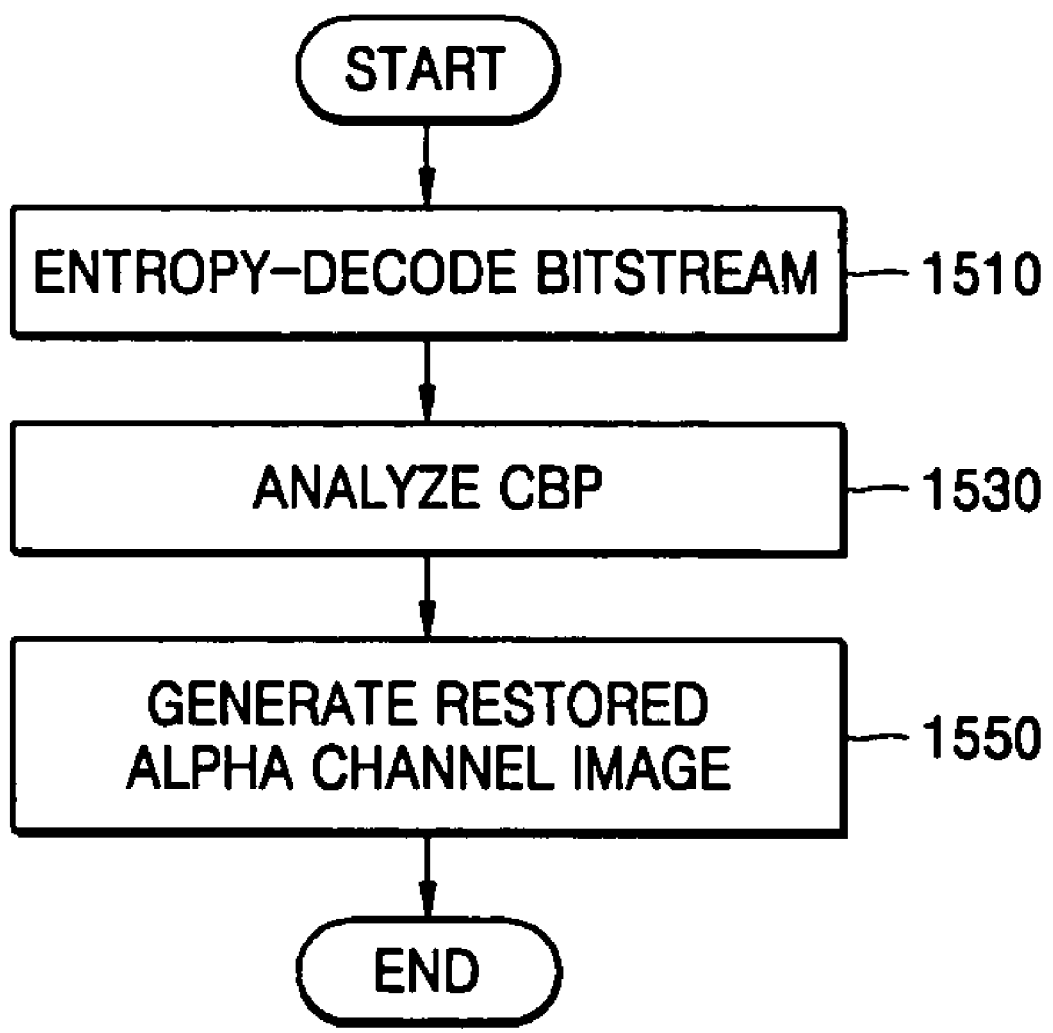
FIG. 15 is a flowchart illustrating an alpha channel image decoding method according to an embodiment of the present invention.

FIG. 15 is a flowchart illustrating an alpha channel image decoding method according to an embodiment of the present invention. Referring to FIG. 15, in operation 1510, an input bitstream is entropy-encoded. In operation 1530, the CBP for each macroblock is extracted and the CBP of each block included in the macroblock is analyzed. In operation 1550, with reference to the analyzed CBP, an alpha channel image is restored according to the CBP for blocks having only a CBP characteristic of 'opaque' or 'transparent' and using decoded pixel values for blocks in which the CBP characteristics 'opaque' and 'transparent' are mixed.

FIGS. 16A through 16D schematize a process of encoding an alpha channel image according to an embodiment of the present invention. In FIG. 16A, a reference number 1610 denotes an original image, and a reference number 1630 denotes an alpha channel image used to represent a portion to be masked from the original image. A black portion of the alpha channel image 1630 is a 'transparent' portion and has a pixel value of 0, and a white portion of the alpha channel image 1630 is an 'opaque' portion and has a pixel value of 1. FIG. 16B shows an example in which the alpha channel image 1630 is partitioned into blocks having a predetermined size, i.e., 8×8 block units. FIG. 16C shows an example in which the CBP is set to 0 when all of the pixel values included in each 8×8 block are 'transparent,' 1 when all of the pixel values included in each 8×8 block are 'opaque,' and 2 when the characteristics of 'transparent' and 'opaque' are mixed in each 8×8 block. In FIG. 16C, when CBP is 0 or 1, even if pixel values of each 8×8 block are not encoded and only the CBP of each 8×8 block is encoded, an alpha channel image may be restored by decoding only the CBP information. When the CBP is 2, the CBP and pixel values of each 8×8 block must be encoded. In a method of encoding pixel values, the pixel values of each block are scanned in a predetermined order, and entropy encoding, i.e., run-level encoding, may be performed. Here, the MPEG4 or H.264 standard may be applied to the method of encoding pixel values. In the MPEG-4 standard, a 3D run-level encoding method in which 'last,' 'run,' and 'level' are encoded in 4×4 block units is used. Here, 'last' denotes whether a value, which is not 0, to be encoded exists in a current block. In the H.264 standard, a method of encoding 'run' and 'level' in 4×4 block units is used. In each method, a sign of each 'level' is separately encoded. However, when an alpha channel image is encoded, it is unnecessary to encode the sign of each 'level.'

Prediction encoded values may be run-level encoded by performing the temporal/spatial prediction encoding before the run-level encoding. Also, Quantized values may be run-level encoded by performing transforming/quantizing after the temporal/spatial prediction encoding. When the prediction encoding is performed for a binary image such as an alpha channel image, an Exclusive-OR operation, instead of a subtraction operation between predicted pixel values and pixel values of a current block, is performed. When the subtraction operation is performed, prediction-encoded data has a value of 0 when the predicted pixel values and the pixel values of the current block are the same, and 1 or −1 when the predicted pixel values and the pixel values of the current block are different. However, when the Exclusive-OR operation is performed according to the embodiments of the present invention, since the prediction-encoded data has a value of 0 when the predicted pixel values and the pixel values of the current block are the same, and 1 when the predicted pixel values and the pixel values of the current block are different, when pixel values of blocks are encoded, a sign bit of each 'level' does not have to be encoded.

FIG. 16D shows an example in which the CBP is allocated to each 8×8 block according to the results obtained by performing the prediction encoding. When the prediction encoding is not performed, the CBP has three kinds of values {0, 1, 2}. However, when the prediction encoding is performed, since all of 8×8 blocks may be classified into 8×8 blocks in which all of the pixel values are 0, and 8×8 blocks in which not all of the pixel values are 0 regardless of whether the CBP characteristic is 'transparent' or 'opaque' according to the results of the Exclusive-OR operation, the CBP has two kinds of values {0, 1}. As described above, when the prediction encoding is performed, since the number of blocks in which all of the pixel values are 0 increases, the encoding efficiency of the CBP increases. However, since a prediction mode in the intra mode and a motion vector in the inter mode must be encoded for each block according to prediction methods, the entire encoding efficiency may decrease.

FIG. 17 illustrates examples of a scanning order used to encode pixel values of blocks. In FIG. 17, it is assumed that pixel values are encoded in 4×4 block units, as described in the method of the H.264 standard. FIG. 17A shows a zigzag scanning method, FIG. 17B shows a horizontally scanning method, and FIG. 17C shows a vertically scanning method. The scanning order may be determined by fixedly using one of the three methods, or using a mix of several methods. In the latter case, the scanning order may be determined by using a scanning type encoded and transmitted for each block or using circumferential information instead of the scanning type. For example, when transform encoding is not performed, based on the intra mode, the horizontally scanning method may be used when horizontal prediction is performed, and the vertically scanning method may be used when vertical prediction is performed. Also, by measuring a horizontal slope and a vertical slope using pixel values of adjacent blocks, the zigzag scanning method is used when the two slopes are similar within a predetermined range, the vertically scanning method is used when the two slopes are not similar within the predetermined range and when the horizontal slope is greater than the vertical slope, and the horizontally scanning method is used when the two slopes are not similar within the predetermined range and when the vertical slope is greater than the horizontal slope.

FIG. 18 illustrates a method of partitioning an image into blocks having a predetermined size for temporal prediction of the image. The method is used in the ISO/IEC 14496-10 standard and the ITU-T Rec. H.264 standard. In the method, a 16×16 macroblock is basically partitioned into blocks having various sizes, such as 16×16, 16×8, 8×16, and 8×8, and temporal image values are predicted by obtaining a motion vector of each block. In particular, a fine motion may be exactly sensed by partitioning an 8×8 block into blocks having various sizes, such as 8×8, 8×4, 4×8, and 4×4 again.

When temporal prediction is used, a macroblock (MB) skip method may be used. In the MB skip method, when a sum of absolute values of pixel values of a macroblock in a difference image between a predicted image and a current image is less than a predetermined threshold, the pixel values of the macroblock is not encoded, and only a mark denoting that the encoding of the pixel values of the macroblock is omitted is encoded. According to the MB skip method, encoding of all of the information, such as CBP information, motion vectors and pixel values, is omitted, and unchanged pixel values of a previous image are used for the associated pixel values of a current macroblock. For example, the unchanged pixel values of a macroblock located at the same position of the current image in the previous image are used for the current image, or a specific position of the previous image is calculated using motion vectors of macroblocks located near the current macroblock, and the unchanged pixel values of a macroblock located at the specific position are used for the current image.

Also, when the temporal prediction is used, to use a half-pel/quarter-pel motion prediction method, motion prediction may be performed after magnifying a previous image twice or four times. To magnify an image, bi-linear interpolation is performed in the MPEG-4 standard, and interpolation using a 6-tap filter is performed in the H.264 standard. However, in an alpha channel image, the motion prediction process described above may be omitted to simplify calculation, and to apply the motion prediction process to the alpha channel image, a separate interpolation method besides the interpolation methods described above may be used.

Figures 19A, 19B:
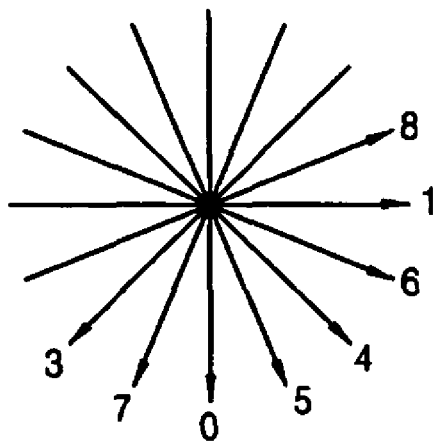
FIGS. 19A and 19B illustrate positions of adjacent pixels for spatial prediction of an image and pixel positions and predicted directions of a current block to be predicted.

FIG. 19A illustrates positions of adjacent pixels for spatial prediction and pixel positions of a current block to be predicted. Like the method illustrated in FIG. 18, the method illustrated in FIG. 19A is used in the ISO/IEC 14496-10 standard and the ITU-T Rec H.264 standard. In FIG. 19A, to predict 4×4 block data $P_a, P_b, \ldots, P_q$, spatially adjacent data $P_0, P_1, \ldots, P_{12}$ previously encoded and restored are used. FIG. 19B illustrates 9 predicted directions from 0 to 8 for predicting a current block by projecting on spatially adjacent pixels. For example, in a case of a 0 direction, by projecting adjacent pixel values $P_1, P_2, P_3,$ and $P_4$ onto the vertical direction:

$P_a, P_e, P_i$ and $P_m$ are predicted as $P_1$, $P_b, P_f, P_j$ and $P_n$ are predicted as $P_2$, $P_c, P_g, P_k$ and $P_o$ are predicted as $P_3$, and $P_d, P_h, P_l$ and $P_q$ are predicted as $P_4$.

Likewise, other directions are also predicted through projection.

The temporal/spatial prediction methods illustrated in FIGS. 18 and 19 are described by using the conventional standard technologies as examples. However, other methods may be used.

The present invention may be embodied in a general-purpose computer by running a program from a computer-readable medium, including but not limited to, storage media such as magnetic storage media (ROMs, RAMs, floppy disks, magnetic tapes, and the like), optically readable media (CD-ROMs, DVDs, and the like), and carrier waves (transmission over the internet). The present invention may be embodied as a computer-readable medium having a computer-readable program code unit embodied therein for causing a number of computer systems connected via a network to effect distributed processing. Also, the functional programs, codes and code segments for embodying the present invention may be easily deducted by programmers in the art to which the present invention belongs.

As described above, in an alpha channel image encoding/decoding apparatus and a method according to the embodiments of the present invention, encoding and decoding of an alpha channel image may be performed independently from a general image signal, and since a structure has compatibility with structures of general image encoding/decoding apparatuses and methods, e.g., a structure of the H.264 standard, the alpha channel image encoding/decoding apparatus and a method may be realized and used with a general image encoding/decoding apparatus and a method, and a high compression rate may be realized.

Also, the CBP encoding efficiency may be increased by generating a CBP for an encoding unit by combining the CBP of blocks, and the pixel value encoding efficiency may be increased by using an Exclusive-OR operation when temporal/spatial prediction encoding is performed.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An alpha channel image decoding apparatus comprising:
a bitstream analyzer analyzing and decoding a bitstream obtained by encoding an alpha channel image of a first block partitioned into a plurality of second blocks, the first block corresponding to an encoding unit;
a coded block pattern (CBP) analyzer extracting and analyzing a CBP of each of the plurality of second blocks partitioned from the first block from the decoded data, wherein the CBP of each of the second blocks is obtained by partitioning a CBP of the first block; and
an image restorer restoring a current alpha channel image using the CBP analyzed for each of the second blocks and decoded pixel values.

2. The apparatus of claim 1, wherein the image restorer restores the current alpha channel image by temporal/spatial-prediction-compensating for the second blocks, to which a CBP indicating that the decoded pixel values of the second block are mixed is allocated, when a CBP is allocated to each second block according to whether all of the pixel values of the second block are transparent, whether all of the pixel values of the second block are opaque, or whether the pixel values of the second block are mixed.

3. The apparatus of claim 2, wherein the image restorer generates temporal/spatial-prediction-compensated second blocks by performing an Exclusive-OR operation of the pixel values of the decoded second blocks and the pixel values predicted from the pixel values of the second blocks with reference to a restored previous image or a restored current image.

4. The apparatus of claim 2, wherein in the bitstream analyzer, a scanning order used to decode the pixel values of blocks is varied according to a horizontal slope and a vertical slope measured using the pixel values of adjacent blocks.

5. The apparatus of claim 2, wherein in the bitstream analyzer, a scanning order used to decode the pixel values of blocks is varied according to a prediction mode.

6. The apparatus of claim 1, wherein the image restorer restores the current alpha channel image by temporal/spatial-prediction-compensating for and inverse-quantizing/inverse-transforming second blocks, to which a CBP indicating that the decoded pixel values of the second block are mixed is allocated, when a CBP is allocated to each second block according to whether all of the pixel values of the second block are transparent, whether all of the pixel values of the second block are opaque, or whether the pixel values of the second block are mixed.

7. The apparatus of claim 6, wherein the image restorer generates temporal/spatial-prediction-compensated second blocks by performing an Exclusive-OR operation of the pixel values of the decoded second blocks and the pixel values predicted from the pixel values of the second blocks with reference to a restored previous image or a restored current image.

8. The apparatus of claim 6, wherein in the bitstream analyzer, a scanning order used to decode the pixel values of blocks is varied according to a horizontal slope and a vertical slope measured using the pixel values of adjacent blocks.

9. The apparatus of claim 6, wherein in the bitstream analyzer, a scanning order used to decode the pixel values of blocks is varied according to a prediction mode.

10. The apparatus of claim 1, wherein the image restorer restores the current alpha channel image by temporal/spatial-prediction-compensating for the second blocks, to which a CBP indicating that the decoded pixel values of the second block are mixed is allocated, when configuration forms of the plurality of second blocks comprising the first block are classified and a CBP is allocated to each of the plurality of the second blocks according to the classified configuration forms.

11. The apparatus of claim 10, wherein the image restorer generates temporal/spatial-prediction-compensated second blocks by performing an Exclusive-OR operation of the pixel values of the decoded second blocks and the pixel values predicted from the pixel values of the second blocks with reference to a restored previous image or a restored current image.

12. The apparatus of claim 10, wherein in the bitstream analyzer, a scanning order used to decode the pixel values of blocks is varied according to a horizontal slope and a vertical slope measured using the pixel values of adjacent blocks.

13. The apparatus of claim 10, wherein in the bitstream analyzer, a scanning order used to decode the pixel values of blocks is varied according to a prediction mode.

14. The apparatus of claim 1, wherein the image restorer restores the current alpha channel image by temporal/spatial-prediction-compensating for and inverse-quantizing/inverse-transforming second blocks, to which a CBP indicating that the decoded pixel values of the second block are mixed is allocated, when configuration forms of the plurality of second blocks comprising the first block are classified and a CBP is allocated to each of the plurality of second blocks according to the classified configuration forms.

15. The apparatus of claim 14, wherein the image restorer generates temporal/spatial-prediction-compensated second blocks by performing an Exclusive-OR operation of the pixel values of the decoded second blocks and the pixel values predicted from the pixel values of the second blocks with reference to a restored previous image or a restored current image.

16. The apparatus of claim 14, wherein in the bitstream analyzer, a scanning order used to decode the pixel values of blocks is varied according to a horizontal slope and a vertical slope measured using the pixel values of adjacent blocks.

17. The apparatus of claim 14, wherein in the bitstream analyzer, a scanning order used to decode the pixel values of blocks is varied according to a prediction mode.

18. The apparatus of claim 1, wherein the image restorer restores the current alpha channel image by temporal/spatial-prediction-compensating for all of the second blocks regardless of CBPs of the decoded second blocks, when a CBP is allocated to each of the plurality of second blocks in the temporal/spatial-prediction-encoded alpha channel image according to whether all of the pixel values of the second blocks are 0 and whether not all of the pixel values of the second blocks are 0.

19. The apparatus of claim 18, wherein the image restorer generates temporal/spatial-prediction-compensated second blocks by performing an Exclusive-OR operation of the pixel values of the decoded second blocks and the pixel values predicted from the pixel values of the second blocks with reference to a restored previous image or a restored current image.

20. The apparatus of claim 18, wherein in the bitstream analyzer, a scanning order used to decode the pixel values of blocks is varied according to a horizontal slope and a vertical slope measured using the pixel values of adjacent blocks.

21. The apparatus of claim 18, wherein in the bitstream analyzer, a scanning order used to decode the pixel values of blocks is varied according to a prediction mode.

22. The apparatus of claim 1, wherein the image restorer restores the current alpha channel image by temporal/spatial-prediction-compensating for and inverse-quantizing/inverse-transforming all of the second blocks regardless of CBPs of the decoded second blocks, when a CBP is allocated to each of the plurality of second blocks in the temporal/spatial-prediction-encoded alpha channel image according to whether all of the pixel values of the second blocks are 0 and whether not all of the pixel values of the second blocks are 0.

23. The apparatus of claim 22, wherein the image restorer generates temporal/spatial-prediction-compensated second blocks by performing an Exclusive-OR operation of the pixel values of the decoded second blocks and the pixel values predicted from the pixel values of the second blocks with reference to a restored previous image or a restored current image.

24. The apparatus of claim 22, wherein in the bitstream analyzer, a scanning order used to decode the pixel values of blocks is varied according to a horizontal slope and a vertical slope measured using the pixel values of adjacent blocks.

25. The apparatus of claim 1, wherein in the bitstream analyzer, a scanning order used to decode the pixel values of blocks is varied according to a horizontal slope and a vertical slope measured using the pixel values of adjacent blocks.

26. An alpha channel image decoding method comprising:
using a computer to perform the steps of,
analyzing and decoding a bitstream obtained by encoding an alpha channel image of a first block partitioned into a plurality of second blocks, the first block corresponding to an encoding unit;
extracting and analyzing a coded block pattern (CBP) of each of the plurality of second blocks partitioned from the first block from the decoded data, wherein the CBP of each of the second blocks is obtained by partitioning a CBP of the first block; and
restoring a current alpha channel image using the CBP analyzed for each of the second blocks and decoded pixel values.

27. The method of claim 26, wherein the current alpha channel image is restored by temporal/spatial-prediction-compensating for the second blocks, to which a CBP indicating that the decoded pixel values of the second block are mixed is allocated, when a CBP is allocated to each second block according to whether all of the pixel values of the second block are transparent, whether all of the pixel values of the second block are opaque, or whether the pixel values of the second block are mixed.

28. The method of claim 27, wherein the temporal/spatial-prediction-compensated second blocks are generated by performing an Exclusive-OR operation of the pixel values of the decoded second blocks and the pixel values predicted from the pixel values of the second blocks with reference to a restored previous image or a restored current image.

29. The method of claim 26, wherein the current alpha channel image is restored by temporal/spatial-prediction-compensating for and inverse-quantizing/inverse-transforming second blocks, to which a CBP indicating that the decoded pixel values of the second block are mixed is allocated, when a CBP is allocated to each second block according to whether all of the pixel values of the second block are transparent, whether all of the pixel values of the second block are opaque, or whether the pixel values of the second block are mixed.

30. The method of claim 29, wherein the temporal/spatial-prediction-compensated second blocks are generated by performing an Exclusive-OR operation of the pixel values of the decoded second blocks and the pixel values predicted from the pixel values of the second blocks with reference to a restored previous image or a restored current image.

31. The method of claim 26, wherein the current alpha channel image is restored by temporal/spatial-prediction-compensating for second blocks, to which a CBP indicating that the decoded pixel values of the second block are mixed is allocated, when configuration forms of the plurality of second blocks comprising the first block are classified and a CBP is allocated to each of the plurality of second blocks according to the classified configuration forms.

32. The method of claim 31, wherein the temporal/spatial-prediction-compensated second blocks are generated by performing an Exclusive-OR operation of the pixel values of the decoded second blocks and the pixel values predicted from the pixel values of the second blocks with reference to a restored previous image or a restored current image.

33. The method of claim 26, wherein the current alpha channel image is restored by temporal/spatial-prediction-compensating for and inverse-quantizing/inverse-transforming second blocks, to which a CBP indicating that the decoded pixel values of the second block are mixed is allocated, when configuration forms of the plurality of second blocks comprising the first block are classified and a CBP is allocated to each of the plurality of second blocks according to the classified configuration forms.

34. The method of claim 33, wherein the temporal/spatial-prediction-compensated second blocks are generated by performing an Exclusive-OR operation of the pixel values of the decoded second blocks and the pixel values predicted from the pixel values of the second blocks with reference to a restored previous image or a restored current image.

35. The method of claim 26, wherein the current alpha channel image is restored by temporal/spatial-prediction-compensating for all of the second blocks without regard to the CBPs of the decoded second blocks, when a CBP is allocated to each of the plurality of second blocks in the temporal/spatial-prediction-encoded alpha channel image according to whether all of the pixel values of the second blocks are 0 and whether not all of the pixel values of the second blocks are 0.

36. The method of claim 35, wherein the temporal/spatial-prediction-compensated second blocks are generated by performing an Exclusive-OR operation of the pixel values of the decoded second blocks and the pixel values predicted from the pixel values of the second blocks with reference to a restored previous image or a restored current image.

37. The method of claim 26, wherein the current alpha channel image is restored by temporal/spatial-prediction-compensating for and inverse-quantizing/inverse-transforming all of the second blocks regardless of CBPs of the decoded second blocks, when a CBP is allocated to each of the plurality of second blocks in the temporal/spatial-prediction-encoded alpha channel image according to whether all of the pixel values of the second blocks are 0 and whether not all of pixel values of the second blocks are 0.

38. The method of claim 37, wherein in the temporal/spatial-prediction-compensated second blocks are generated by performing an Exclusive-OR operation of the pixel values of the decoded second blocks and the pixel values predicted from the pixel values of the second blocks with reference to a restored previous image or a restored current image.

39. A non-transitory computer readable medium having recorded thereon a computer readable program to perform an alpha channel image decoding method comprising:

analyzing and decoding a bitstream obtained by encoding an alpha channel image of a first block partitioned into a plurality of second blocks, the first block corresponding to an encoding unit;

extracting and analyzing a coded block pattern (CBP) for each of the plurality of second blocks partitioned from the first block from the decoded data, wherein the CBP of each of the second blocks is obtained by partitioning a CBP of the first block; and restoring a current alpha channel image using the CBP analyzed for each of the second blocks and decoded pixel values.

* * * * *